(12) United States Patent
Solondz et al.

(10) Patent No.: US 9,369,588 B2
(45) Date of Patent: Jun. 14, 2016

(54) DETERMINING COMPENSATION FOR USE OF A SHARED FREQUENCY IN MULTIPLE JURISDICTIONS

(71) Applicant: Verizon Patent and Licensing Inc., Arlington, VA (US)

(72) Inventors: Max A. Solondz, New Vernon, NJ (US); Arda Aksu, Martinez, CA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 78 days.

(21) Appl. No.: 14/287,650

(22) Filed: May 27, 2014

(65) Prior Publication Data
US 2015/0350453 A1    Dec. 3, 2015

(51) Int. Cl.
*H04M 15/00* (2006.01)
*H04W 36/00* (2009.01)
*H04W 4/26* (2009.01)

(52) U.S. Cl.
CPC .............. *H04M 15/54* (2013.01); *H04M 15/78* (2013.01); *H04W 4/26* (2013.01); *H04W 36/0005* (2013.01)

(58) Field of Classification Search
CPC .......... G06Q 30/0273; G06Q 30/0267; G06Q 30/0261; G06Q 30/0251; H04L 12/14; H04L 41/5029; H04L 12/5695; H04L 47/15; H04L 47/805; H04W 48/16; H04W 48/18; H04W 4/02; H04W 4/206; H04W 76/04; H04W 28/22; H04W 36/18; H04W 88/12; H04W 36/0083; H04W 36/08; H04W 4/26; H04W 52/267; H04W 52/343; H04W 88/08; H04W 36/0066; H04W 36/0094; H04W 36/14; H04W 52/283; H04W 52/325; H04W 52/44; H04W 68/00; H04W 88/06; H04M 15/58; H04M 3/42161; H04M 3/42246; H04M 2215/2026; H04M 2215/206; H04M 2215/96
See application file for complete search history.

(56) References Cited

U.S. PATENT DOCUMENTS

| | | | |
|---|---|---|---|
| 2009/0023458 A1* | 1/2009 | Mountney | 455/456.1 |
| 2010/0118774 A1* | 5/2010 | Gotthard et al. | 370/328 |
| 2012/0264396 A1 | 10/2012 | Smith et al. | |

OTHER PUBLICATIONS

Wikipedia, "First Responder Network Authority (FirstNet)", http://en.wikipedia.org/wiki/First_Responder_Network_Authority_(FirstNet), Feb. 8, 2014, 2 pages.

* cited by examiner

*Primary Examiner* — Nizar Sivji

(57) ABSTRACT

One or more devices may be configured to store jurisdiction information that associates each of a plurality of base stations with at least one jurisdiction. The one or more devices may establish a session, between a first base station and a user device, that uses a frequency. The one or more device may record handover information based on the first base station handing over the session to a second base station. The handover information may indicate an amount of data used while the session is hosted by the first base station. The one or more devices may determine a particular jurisdiction associated with the first base station based on the jurisdiction information. The one or more devices may cause a particular rights holder to be compensated for use of the frequency based on the amount of data used while the session is hosted by the first base station.

20 Claims, 9 Drawing Sheets

| Cell | Data Used | Frequency | Jurisdiction | Payment |
|---|---|---|---|---|
| 604 | 1.2 MB | Band 14 | 100% B | $0.12 |
| 606 | 0.2 MB | Band 14 | 100% B | $0.02 |
| 608 | 0.9 MB | Band 13 | 100% B | $0.00 |
| 610 | 1.0 MB | Band 14 | 80% A / 10% B / 10% C | $0.08 / $0.01 / $0.01 |
| 612 | 0.1 MB | Band 14 | 100% C | $0.01 |
| 614 | 1.1 MB | Band 14 | 100% C | $0.11 |
| 616 | 0.5 MB | Band 13 | 100% C | $0.00 |

DETERMINING COMPENSATION FOR USE OF A SHARED FREQUENCY IN MULTIPLE JURISDICTIONS

BACKGROUND

A frequency rights holder may own rights to a frequency (e.g., a frequency spectrum, a frequency band, etc.) in a particular jurisdiction (e.g., a geographic area). The frequency rights holder may use the shared frequency for a non-commercial purpose. For example, the frequency may be allocated for public safety use and/or educational use and controlled by local governments and/or schools.

DETAILED DESCRIPTION OF PREFERRED EMBODIMENTS

The following detailed description of example implementations refers to the accompanying drawings. The same reference numbers in different drawings may identify the same or similar elements.

A shared frequency rights holder may seek to share a shared frequency with a commercial entity to raise revenue. For example, if the shared frequency rights holder is not fully utilizing the shared frequency for a non-commercial purpose, the shared frequency rights holder may desire to allow a commercial operator network to use any extra capacity of the shared frequency and charge the commercial entity for the use of the shared frequency.

In practice, the shared frequency may be controlled by various shared frequency rights holders in different jurisdictions. For example, a first local government may control the shared frequency in a first jurisdiction, and a second local government may control the shared frequency in a second jurisdiction. In order to properly compensate the shared frequency rights holders, a commercial operator network that uses the extra capacity of the shared frequency may have to determine how much traffic was used by the commercial operator network on the shared frequency in each jurisdiction.

However, accurately determining how much traffic was used in each jurisdiction may be difficult when a user device that communicates with the commercial operator network via the shared frequency moves between jurisdictions during a communication session. For example, a commercial operator network may record a total amount of traffic used during any one session (e.g., a number of minutes on a call and/or an amount of data used), but may not record where that traffic was utilized throughout the session.

Implementations described herein may record handover information from base station to base station during a session and determine how much traffic, on a shared frequency, was used during the session based on the handover information. Accordingly, shared frequency rights holders may be compensated by a commercial operator network based on the amount of traffic, on the shared frequency, used in respective jurisdictions.

Figure 1:
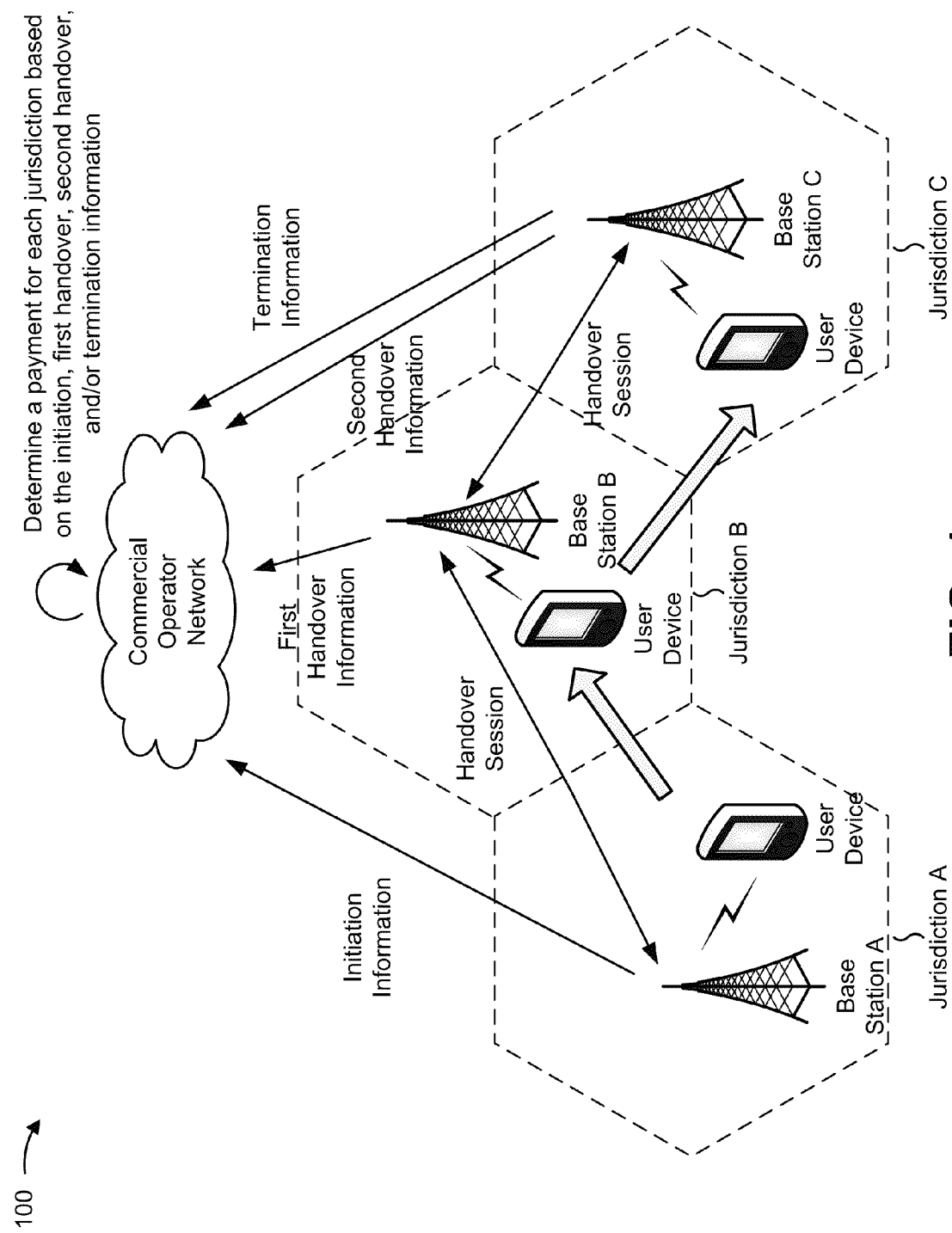
FIG. 1 is a diagram of an overview of an example implementation described herein.

FIG. 1 is a diagram of an overview of an example implementation 100 described herein. In FIG. 1, assume a shared frequency rights holder A owns the rights to the shared frequency in jurisdiction A, a shared frequency rights holder B owns the rights to the shared frequency in jurisdiction B, and a shared frequency rights holder C owns the rights to the shared frequency in jurisdiction C. Further, assume that shared frequency rights holders A, B, and C allow a commercial operator network to use the shared frequency in jurisdictions A, B, and C for commercial purposes when there is unused capacity.

As shown in FIG. 1, a user device may initiate a session with the commercial operator network via a base station A in jurisdiction A. Assume the user device and base station A use the shared frequency to communicate. The commercial operator network may record initiation information indicating that the shared frequency is used by base station A for the session.

As further shown in FIG. 1, the user device may move during the session and base station A may handover the session to a base station B in jurisdiction B. Assume the user device and base station B use the shared frequency to communicate. The commercial operator network may record first handover information indicating how much data was used for the session at base station A between initiation and the first handover, and indicate that the shared frequency is used by base station B for the session.

As further shown in FIG. 1, the user device may move during the session and base station B may handover the session to a base station C in jurisdiction C. Assume the user device and base station C use the shared frequency to communicate. The commercial operator network may record second handover information indicating how much data was used by base station B for the session between the first handover and the second handover, and indicate that the shared frequency is used by base station C for the session.

As further shown in FIG. 1, the session with the user device may be terminated at base station C. The commercial operator network may record termination information indicating how much data was used by base station C for the session between the second handover and the termination.

The commercial operator network may determine how much data was used at each base station during the session based on the initiation information, the first and second handover information, and/or the termination information.

Assume the commercial operator network may store jurisdiction information indicating which base stations are in which jurisdictions. Accordingly, the commercial operator network may determine how much data was used in each jurisdiction based on how much data was used at each base station and the jurisdiction information. Furthermore, assume the commercial operator stores payment information indicating how much each of shared frequency rights holders A, B, and C charge for use of the shared frequency in jurisdictions A, B, and C. Accordingly, the commercial operator network may determine a payment for each of the frequency rights holders A, B, and C based on how much data was used in each jurisdiction and the payment information. The commercial network may then pay each of the shared frequency rights holders A, B, and C for use of the shared frequency in the respective jurisdictions.

In this way, the commercial operator network may pay each shared frequency rights holder based on the use of a shared frequency in a jurisdiction that a respective frequency rights holder controls the shared frequency.

Figure 2A:
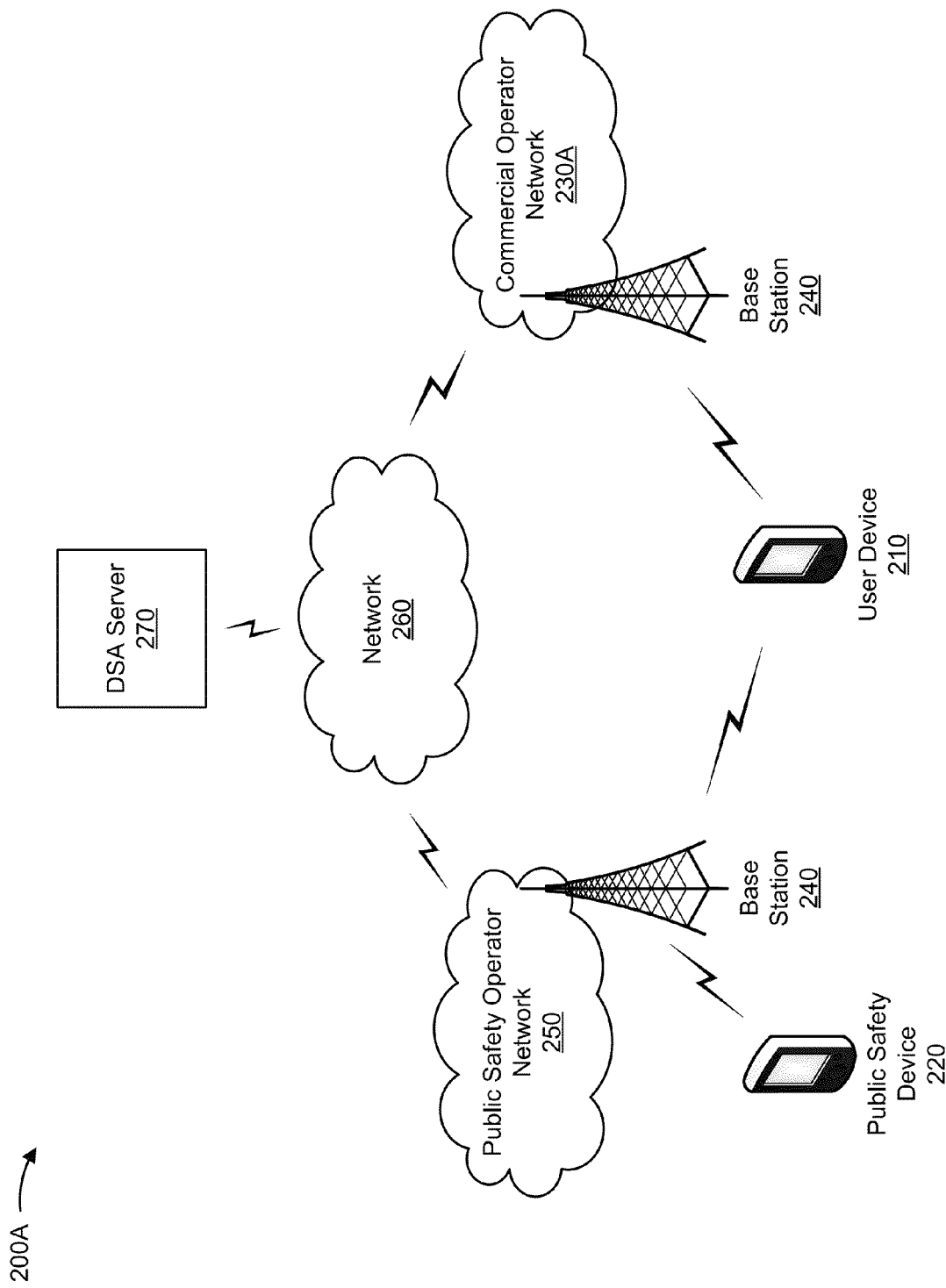
FIGS. 2A and 2B are diagrams of example environments in which systems and/or methods, described herein, may be implemented.

FIG. 2A is a diagram of an example environment 200A in which systems and/or methods, described herein, may be implemented. As shown in FIG. 2A, environment 200A may include user device 210, public safety device 220, commercial operator network 230A, base station 240, public safety operator network 250, network 260, and/or Shared Frequency Management (SFM) server 270. Devices of environment 200A may interconnect via wired connections, wireless connections, or a combination of wired and wireless connections.

User device 210 may include a device capable of receiving, processing, and providing information. For example, user device 210 may include a mobile phone (e.g., a smart phone, a radiotelephone, etc.), a computing device (e.g., a laptop computer, a tablet computer, a handheld computer, a gaming device, etc.), or a similar device. In some implementations, user device 210 may include a communication interface that allows user device 210 to receive information from and/or transmit information to another device in environment 200A. In some implementations, user device 210 may be capable of communicating with public safety operator network 250 via a shared frequency, and may be capable of commutating with commercial operator network 230A via the shared frequency and other frequencies.

Public safety device 220 may include a device capable of receiving, processing, and providing information. For example, public safety device 220 may include a mobile phone (e.g., a smart phone, a radiotelephone, etc.), a computing device (e.g., a laptop computer, a tablet computer, a handheld computer, a gaming device, etc.), or a similar device. In some implementations, public safety device 220 may include a communication interface that allows public safety device 220 to receive information from and/or transmit information to another device in environment 200A. In some implementations, public safety device 220 may be capable of communicating with public safety network 250 via the shared frequency.

Commercial operator network 230A may include an evolved packet system (EPS) that includes a long term evolution (LTE) network and/or an evolved packet core (EPC) that operate based on a third generation partnership project (3GPP) wireless communication standard. The LTE network may be a radio access network (RAN) that includes one or more base stations (e.g., base station 240), such as eNodeBs (eNBs), via which client devices (e.g., smart phones, tablet computers, machine-to-machine (M2M) devices, etc.) communicate with the EPC. The EPC may include a serving gateway (SGW), a mobility management entity device (MME), and/or a packet data network gateway (PGW) that enables the client devices to communicate with network 260 and/or an Internet protocol (IP) multimedia subsystem (IMS) core. The IMS core may include a home subscriber server (HSS)/authentication, authorization, accounting (AAA) server and/or a call session control function (CSCF) server and may manage certain information and services, such as authentication, session initiation, account information, and/or a user profile, associated with the client devices. The LTE network may include multiple base stations 240, and the EPC may include multiple SGWs, MMEs, and/or PGWs. Additionally, or alternatively, commercial operator network 230A may include a cellular network, a public land mobile network (PLMN), a second generation (2G) network, a third generation (3G) network, a fourth generation (4G) network, a fifth generation (5G) network, and/or a similar type of network. In some implementations, commercial operator network 230A may be capable of communicating with user device 210 via the shared frequency and other frequencies. In some implementations, commercial operator network 230A may use the shared frequency for communication related to commercial use when the shared frequency is not being fully utilized for public safety purposes.

Base station 240 may include one or more devices capable of transferring traffic, such as audio, video, text, and/or other traffic, destined for and/or received from user device 210 and/or public safety device 220. In some implementations, one or more base stations 240 may include an eNB associated with commercial operator network 230A that receives traffic from and/or sends traffic to network 260 via a SGW and/or a PGW. Additionally, or alternatively, one or more base stations 240 may be associated with a RAN, such as public safety operator network 250. Base station 240 may send traffic to and/or receive traffic from user device 210 and/or public safety device 220 via an air interface. In some implementations, base station 210 may include a small cell base station, such as a base station of a microcell, a picocell, and/or a femtocell.

Public safety operator network 250 may include a cellular network, a PLMN, a LTE network, a 2G network, a 3G network, a 4G network, a 5G network, and/or a similar type of network. In some implementations, public safety operator network 250 may be a RAN that includes one or more base stations (e.g., base station 240), such as eNBs, via which public safety device 220 communicates with public safety operator network 250 and/or network 260. In some implementations, public safety operator network 250 may be capable of communicating with user device 210 and/or public safety device 220 via the shared frequency. In some implementations, public safety operator network 250 may use the shared frequency for communication related to public safety. In some implementations, public safety operator network 250 may use the shared frequency for private communication unrelated to public safety.

Network 260 may include one or more wired and/or wireless networks. For example, network 260 may include a cellular network, a PLMN, a 2G network, a 3G network, a 4G network, a 5G network, a LTE network, and/or a similar type of network. Additionally, or alternatively, network 260 may include a local area network (LAN), a wide area network (WAN), a metropolitan area network (MAN), a telephone network (e.g., the Public Switched Telephone Network (PSTN)), an ad hoc network, an intranet, the Internet, a fiber optic-based network, a satellite network, a cloud computing network, and/or a combination of these or another type of network.

SFM server 270 may include one or more devices capable of storing, processing, and/or routing information. In some implementations, SFM server 270 may include a communication interface that allows SFM server 270 to receive information from and/or transmit information to other devices in environment 200A. In some implementations, SFM server 270 may determine the availability of the shared frequency for commercial use by commercial operator network 230A.

The number and arrangement of devices and networks shown in FIG. 2A is provided as an example. In practice, there may be additional devices and/or networks, fewer devices and/or networks, different devices and/or networks, or differently arranged devices and/or networks than those shown in FIG. 2A. Furthermore, two or more devices shown in FIG. 2A may be implemented within a single device, or a single device shown in FIG. 2A may be implemented as multiple, distributed devices. Additionally, or alternatively, a set of devices (e.g., one or more devices) of environment 200A may perform one or more functions described as being performed by another set of devices of environment 200A.

Figure 2B:
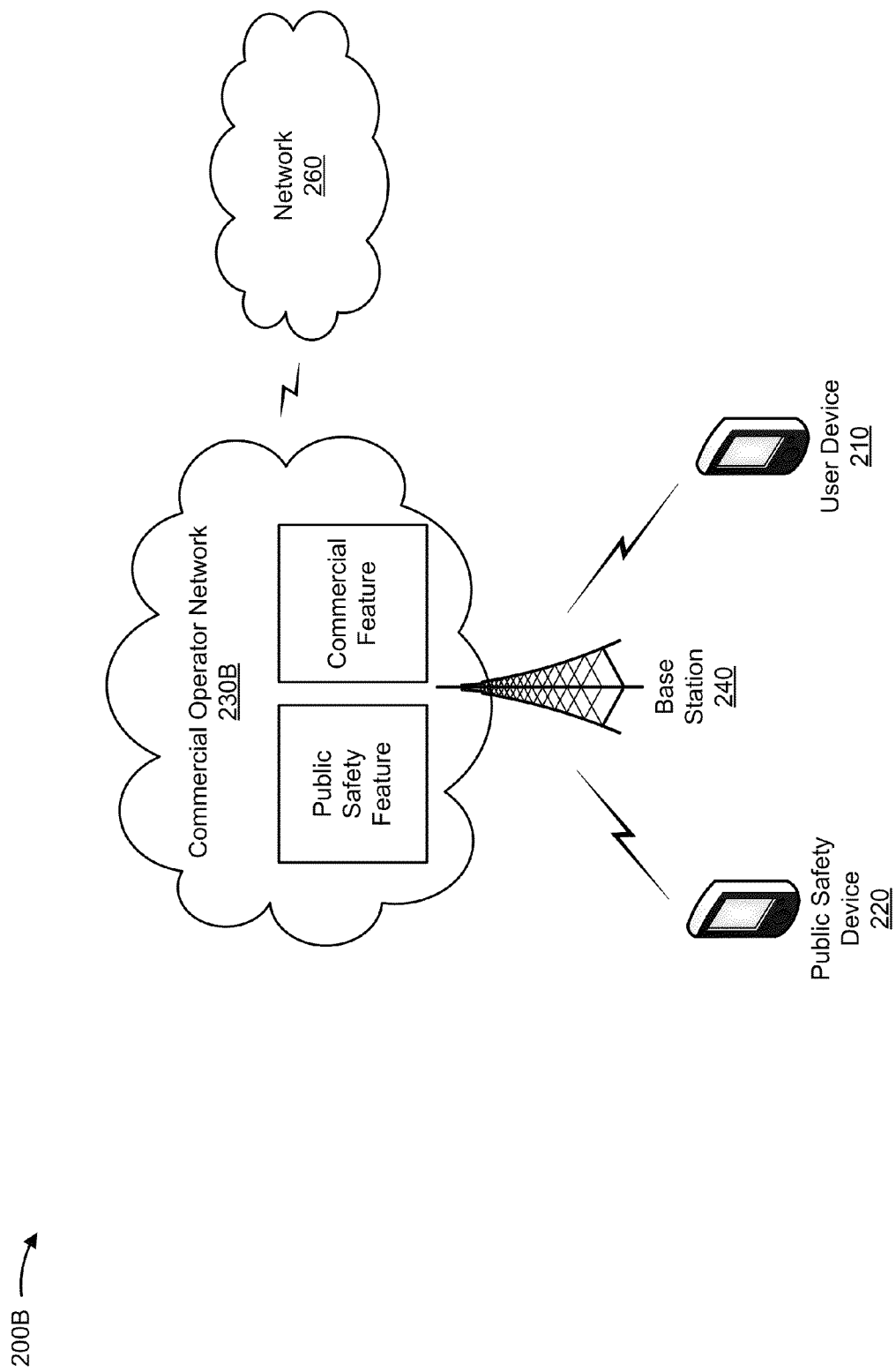

FIG. 2B is a diagram of an example environment 200B in which systems and/or methods, described herein, may be implemented. As shown in FIG. 2B, environment 200B may include user device 210, public safety device 220, commercial operator network 230B, base station 240, and/or network 260. Devices of environment 200B may interconnect via wired connections, wireless connections, or a combination of wired and wireless connections.

As shown in FIG. 2B, rather than public safety operator network 250 operating as a separate network from commercial operator network 230A (e.g., including separate base stations 240) that uses the shared frequency for public safety purposes, commercial operator network 230B may include a public safety feature that uses the shared frequency for public safety purposes, and a commercial feature that uses the shared frequency and other frequencies for commercial purposes. In other words, the public safety feature and the commercial feature may share the same hardware and coexist on a unified network (e.g., commercial operator network 230B). Consequently, rather than SFM server 270 determining the availability of the shared frequency for commercial use, commercial operator network 230B may determine the availability of the shared frequency for commercial use.

Commercial operator network 230B may have the same configuration as commercial operator network 230A as previously described, and thus the configuration of commercial operator network 230B will not be repeated. However, in addition to commercial operator network 230B being capable of communicating with user device 210 via the shared frequency and other frequencies, commercial operator network 230B may communicate with public safety device 220, via the shared frequency, for public safety purposes. In other words, the hardware of commercial operator network 230B may be used for both commercial purposes and public safety purposes, unlike commercial operator network 230A which may not use the shared frequency for public safety purpose.

The number and arrangement of devices and networks shown in FIG. 2B is provided as an example. In practice, there may be additional devices and/or networks, fewer devices and/or networks, different devices and/or networks, or differently arranged devices and/or networks than those shown in FIG. 2B. Furthermore, two or more devices shown in FIG. 2B may be implemented within a single device, or a single device shown in FIG. 2B may be implemented as multiple, distributed devices. Additionally, or alternatively, a set of devices (e.g., one or more devices) of environment 200B may perform one or more functions described as being performed by another set of devices of environment 200B.

As used herein, the term "commercial operator network 230" may refer to commercial operator network 230A and/or commercial operator network 230B.

Figure 3:
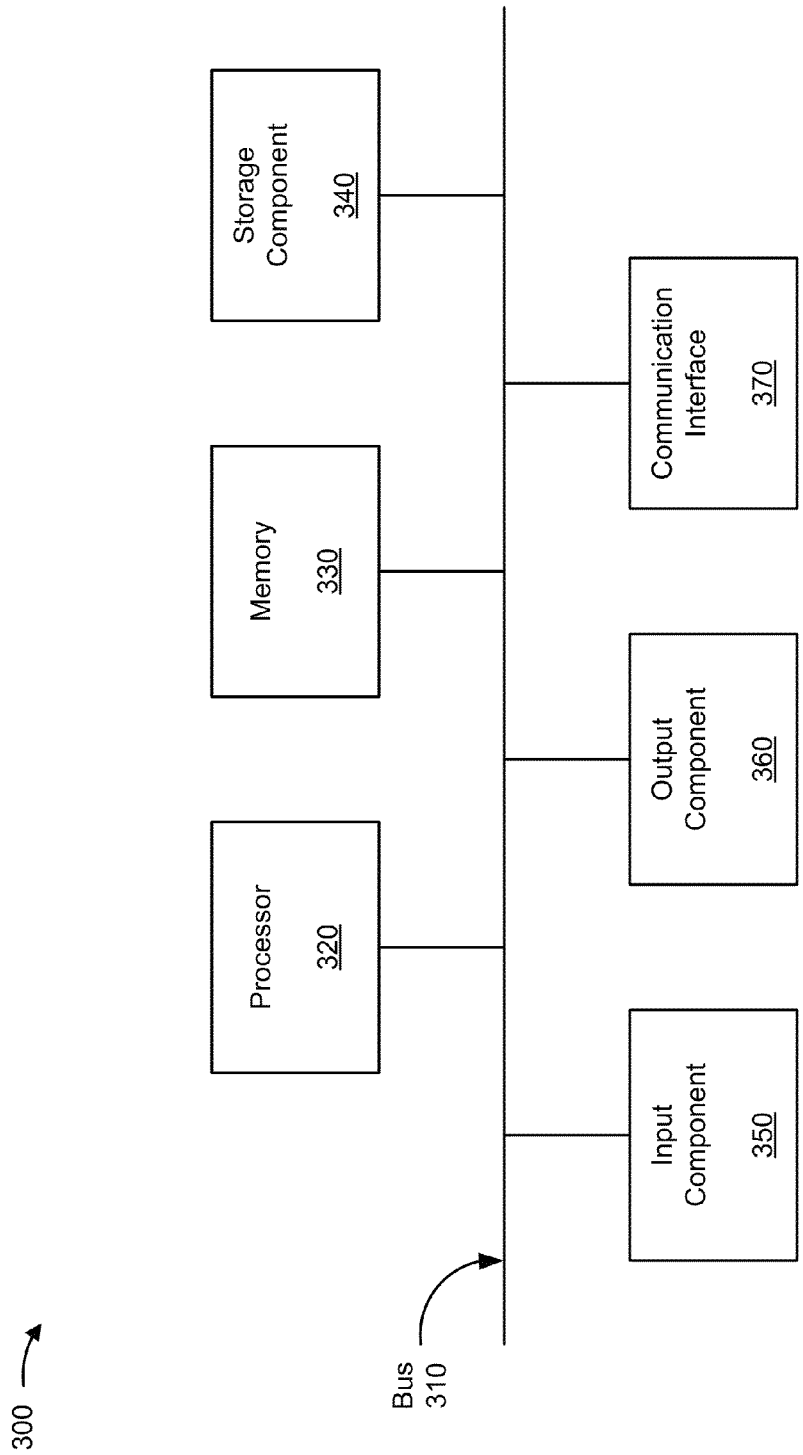
FIG. 3 is a diagram of example components of one or more devices of FIGS. 2A and 2B.

FIG. 3 is a diagram of example components of a device 300. Device 300 may correspond to user device 210, public safety device 220, one or more devices included in operator network 230, base station 240, one or more devices included public safety operator network 250, and/or SFM server 270. In some implementations, user device 210, public safety device 220, one or more devices included in operator network 230, base station 240, one or more devices included public safety operator network 250, and/or SFM server 270 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 may include a component that permits communication among the components of device 300. Processor 320 may include a processor (e.g., a central processing unit (CPU), a graphics processing unit (GPU), an accelerated processing unit (APU), etc.), a microprocessor, and/or any processing component (e.g., a field-programmable gate array (FPGA), an application-specific integrated circuit (ASIC), etc.) that interprets and/or executes instructions. Memory 330 may include a random access memory (RAM), a read only memory (ROM), and/or another type of dynamic or static storage device (e.g., a flash memory, a magnetic memory, an optical memory, etc.) that stores information and/or instructions for use by processor 320.

Storage component 340 may store information and/or software related to the operation and use of device 300. For example, storage component 340 may include a hard disk (e.g., a magnetic disk, an optical disk, a magneto-optic disk, a solid state disk, etc.), a compact disc (CD), a digital versatile disc (DVD), a floppy disk, a cartridge, a magnetic tape, and/or another type of computer-readable medium, along with a corresponding drive.

Input component 350 may include a component that permits device 300 to receive information, such as via user input (e.g., a touch screen display, a keyboard, a keypad, a mouse, a button, a switch, a microphone, etc.). Additionally, or alternatively, input component 350 may include a sensor for sensing information (e.g., a global positioning system (GPS) component, an accelerometer, a gyroscope, an actuator, etc.). Output component 360 may include a component that provides output information from device 300 (e.g., a display, a speaker, one or more light-emitting diodes (LEDs), etc.).

Communication interface 370 may include a transceiver-like component (e.g., a transceiver, a separate receiver and transmitter, etc.) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, or the like.

Device 300 may perform one or more processes described herein. Device 300 may perform these processes in response to processor 320 executing software instructions stored by a computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 is provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
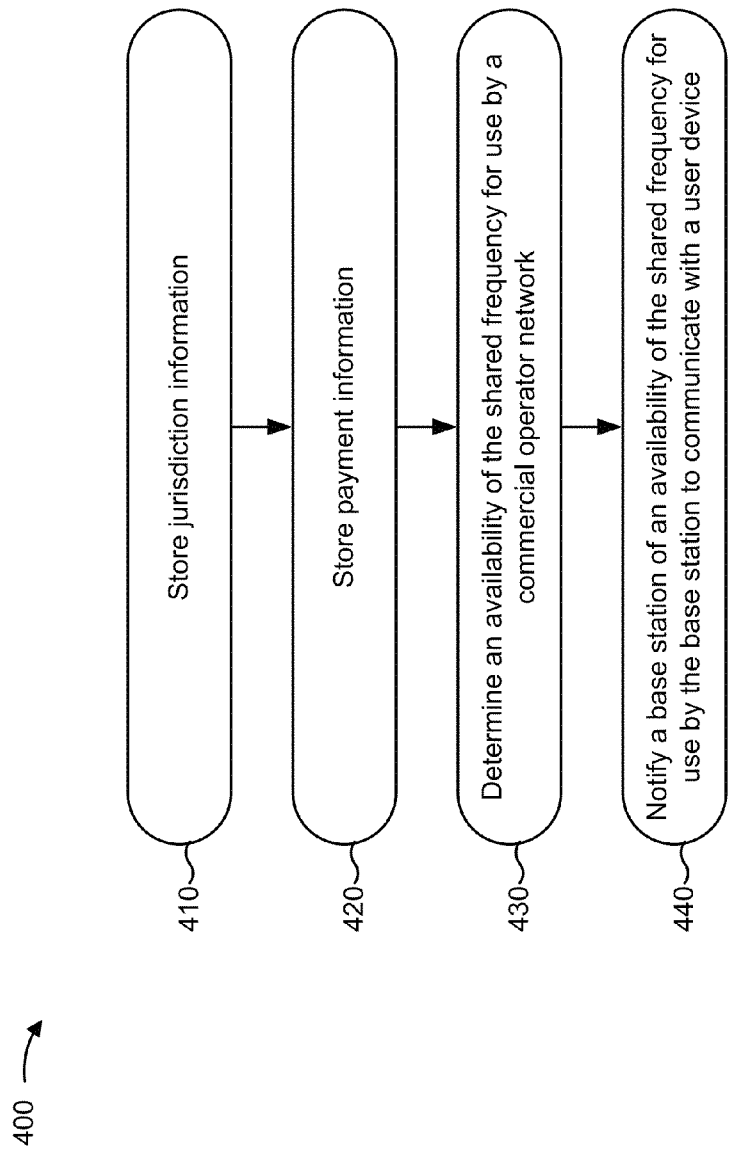
FIG. 4 is a flow chart of an example process for preparing a commercial operator network for using a shared frequency.

FIG. 4 is a flow chart of an example process 400 for preparing commercial operator network 230 for using the shared frequency. In some implementations, one or more process blocks of FIG. 4 may be performed by one or more devices included in commercial operator network 230. In some implementations, one or more process blocks of FIG. 4 may be performed by another device or a group of devices separate from or including commercial operator network 230, such as user device 210, public safety device 220, base station 240, devices included public safety operator network 250, and/or SFM server 270.

As shown in FIG. 4, process 400 may include storing jurisdiction information (block 410). For example, operator network 230 may store jurisdiction information in a memory included in operator network 230 and/or a memory accessible by operator network 230.

The jurisdiction information may associate a base station identifier, which identifies a base station 240 included in commercial operator network 230, with one or more jurisdiction identifiers, which each identifies a jurisdiction included in a coverage area of the associated base station 240. A jurisdiction may be geographical area. The jurisdiction information may also indicate an amount of credit each jurisdiction should receive for use of the shared frequency by base station 240.

For example, assume a coverage area of a particular base station 240 is contained within a single jurisdiction. Accordingly, the jurisdiction information may associate a base station identifier, which identifies the particular base station 240, with a jurisdiction identifier, which identifies the single jurisdiction. Furthermore, the jurisdiction information may indicate that the single jurisdiction should receive all of the credit (e.g., 100% of the credit) for use of the shared frequency by the particular base station 240.

Alternatively, assume a coverage area of a particular base station 240 is contained within a first jurisdiction and a second jurisdiction. Accordingly, the jurisdiction information may associate a base station identifier, which identifies the particular base station 240, with a first jurisdiction identifier, which identifies the first jurisdiction, and a second jurisdiction identifier, which identifies the second jurisdiction. Furthermore, the jurisdiction information may indicate that the first jurisdiction should receive a first share of the credit (e.g., 20% of the credit) for use of the shared frequency by the particular base station 240, and that the second jurisdiction should receive a second share of the credit (e.g., 80% of the credit) for use of the shared frequency by the particular base station 240.

In some implementations, commercial operator network 230 may receive all or part of the jurisdiction information from one or more shared frequency rights holders that control or own rights to the shared frequency in the jurisdictions. A shared frequency rights holder may include a state government, a county government, a city government, or a third party (e.g., an operator of SFM server 270) that has rights to the shared frequency and allows commercial operator network 230 to use the shared frequency for commercial purposes when not being fully utilized for the shared frequency rights holder's purpose (e.g., public safety). For example, shared frequency rights holders that control the shared frequency may make agreements between themselves about a share of credit each jurisdiction should receive for use of the shared frequency by base stations 240.

Additionally, or alternatively, commercial operator network 230 may generate all or part of the jurisdiction information. For example, commercial operator network 230 may determine which jurisdictions are included in a coverage area of a base station 240 based on calculating the coverage area of a base station 240 and a geographic area of the jurisdiction. Furthermore, commercial operator network 230 may determine the share of credit each jurisdiction should receive for use of the shared frequency. For example, commercial operator network 230 may calculate a share based on a proportion of the coverage area included in the jurisdiction, based on a proportion of people and/or user devices 210 included within the coverage area and the jurisdiction, and/or based on a location of roads (e.g., highways, interstates, streets, etc.) within the coverage area.

As further shown in FIG. 4, process 400 may include storing payment information (block 420). For example, commercial operator network 230 may store the payment information in a memory included in commercial operator network 230 and/or in a memory accessible by commercial operator network 230.

The payment information may indicate an amount of money that commercial operator network 230 is charged for using the shared frequency in a respective jurisdiction. For example, the payment information may associate a jurisdiction identifier with a payment amount. The payment amount may indicate a monetary amount to be paid per amount of data used (e.g., a number of dollars per megabyte (MB) of data used) and/or a monetary amount to be paid per an amount of time used for a call (e.g., a number of dollars per minute used).

Additionally, or alternatively, the payment information may associate the jurisdiction identifier with one more shared frequency rights holder identifiers, which identify shared frequency rights holders to be paid for use of the shared frequency in a jurisdiction. For example, a city government, a county government, and/or a state government may each receive payment for use of the shared frequency in a same jurisdiction. The payment information may indicate a share of the payment that each shared frequency rights holder should receive.

As further shown in FIG. 4, process 400 may include determining an availability of the shared frequency for use by commercial operator network 230 (block 430). For example, commercial operator network 230 may determine the availability of the shared frequency for use.

The shared frequency may be allotted by a shared frequency rights holder, which controls the shared frequency in a jurisdiction, for a primary use (e.g., public safety). Additionally, the shared frequency rights holder may allow the shared frequency to be used for a secondary purpose (e.g., a commercial purpose) by one or more commercial operator networks 230 if the shared frequency is not being fully utilized for the primary purpose at a particular time.

In some implementations (e.g., in environment 200A), public safety operator network 250 may control the use of the shared frequency for a primary purpose (e.g., public safety). Public safety operator network 250 may calculate information indicating a use of the shared frequency in different geographic areas (e.g., an amount of traffic using the shared frequency). Public safety operator network 250 may send the information to SFM server 270. SFM server 270 may receive the information from one or more public safety operator networks 250 and determine an availability of the shared frequency in different geographic locations based on the use of the shared frequency by public safety operator network 250. SFM server 270 may send availability information indicating the availability of the shared frequency for commercial use to commercial operator network 230A. Commercial operator network 230A may receive the availability information from SFM server 270 and determine the availability of the shared frequency for use by commercial operator network 230A based on the availability information.

In some implementations, (e.g., in environment 200B), commercial operator network 230B may be tasked with controlling the use of the shared frequency for a primary purpose (e.g., public safety). Commercial operator network 230B may calculate availability information indicating a use of the shared frequency in different geographic areas and/or determine if any of the shared frequency is available for commercial use in different geographic areas based on the use for the primary purpose.

For example, if the use of the shared frequency for the primary purpose satisfies a particular threshold level of use (e.g., an amount of public safety traffic is below a threshold level of traffic), then the shared frequency may be available for use for a secondary purpose by commercial network 230.

As further shown in FIG. 4, process 400 may include notifying base station 240 of an availability of the shared frequency for use by base station 240 to communicate with user device 210 (block 440). For example, commercial operator network 230 may notify one or more base stations 240 that the shared frequency is available for use to communicate with user device 210.

Commercial operator network 230 may determine which base stations 240 have coverage areas that cover geographic areas where the use of shared frequency for secondary purposes (e.g., commercial purposes) is available. For example, commercial operator network 230 may determine which base stations 240 may use the shared frequency based on the availability information and the jurisdiction information. Commercial operator network 230 may send a notification to those base stations 240 that those base stations 240 may use the shared frequency to communicate with user devices 210.

Base stations 240 may receive the notification and establish connections with user devices 210 using the shared frequency.

On the other hand, if a base station 240 does not receive a notification and/or receives a notification from commercial operator network 230 indicating that base station 240 may not use the shared frequency to communicate with user devices 210, then base station 240 may not establish connections with user devices 210 using the shared frequency. However, in some implementations (e.g., such as environment 200B), a base station 240 included in commercial operator network 230B may still use the shared frequency to establish connections with public safety devices 220 for the primary purpose (e.g., public safety).

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

Figure 5A:
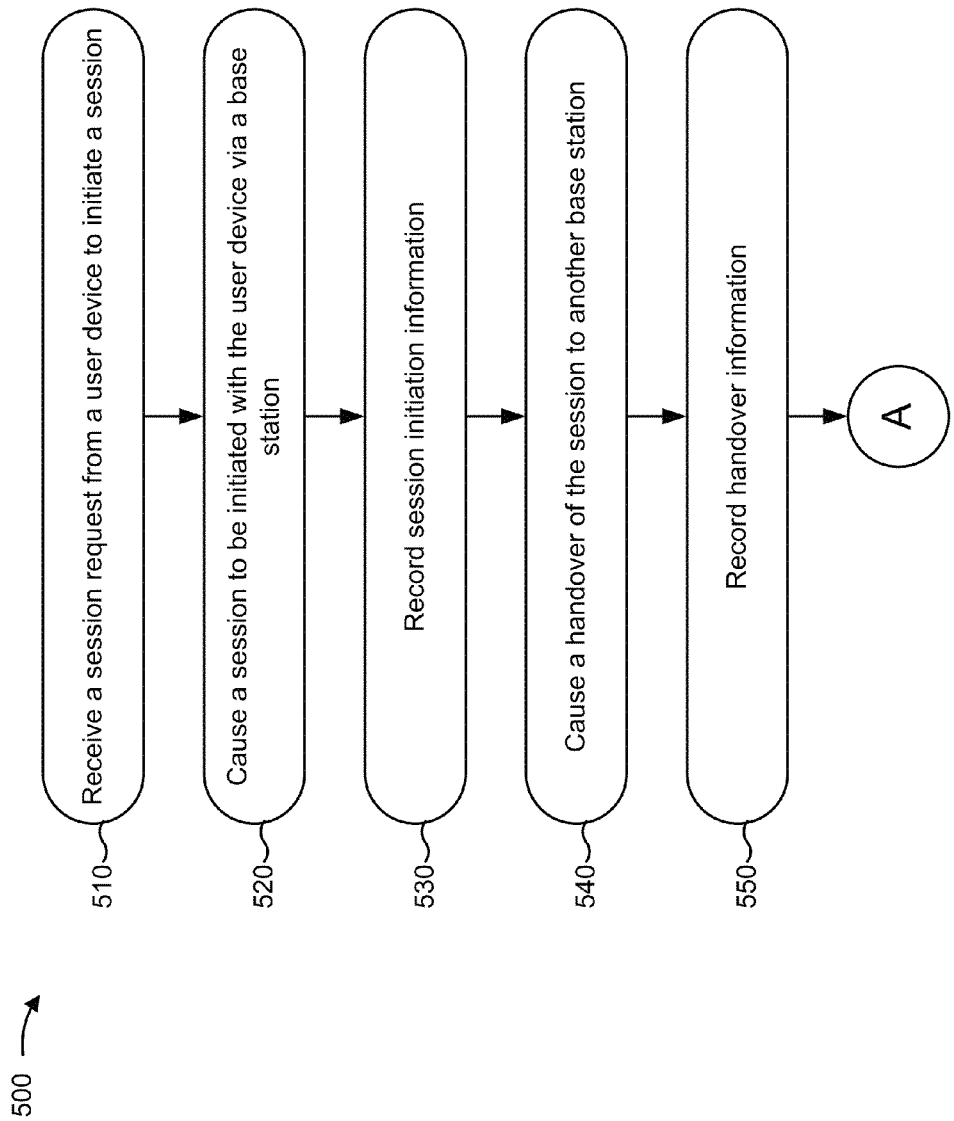
FIGS. 5A and 5B are flow charts of an example process for causing a shared frequency rights holder to be compensated for a commercial operating network using a shared frequency.
Figure 5B:
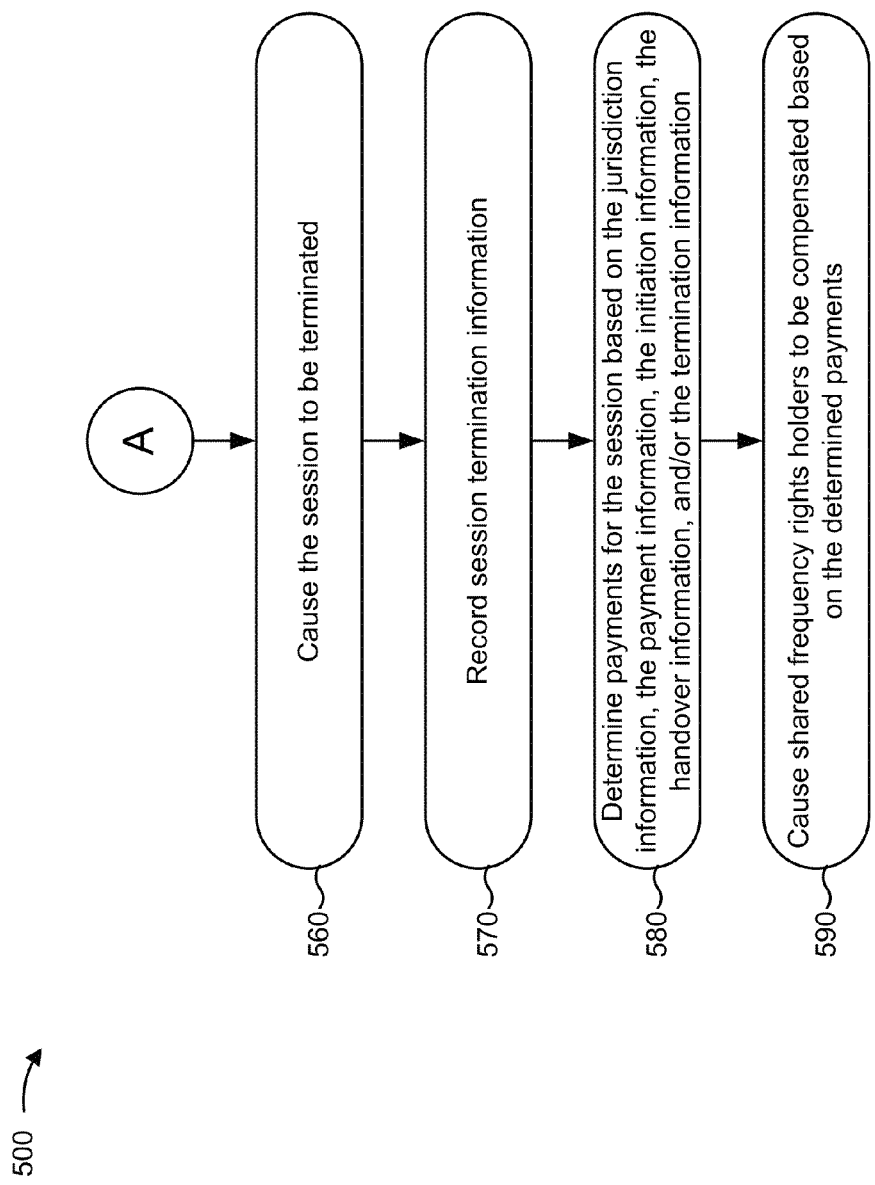

FIGS. 5A and 5B are flow charts of an example process 500 for causing a shared frequency rights holder to be compensated for commercial operating network 230 using the shared frequency. In some implementations, one or more process blocks of FIGS. 5A and 5B may be performed by one or more devices included in commercial operator network 230. In some implementations, one or more process blocks of FIGS. 5A and 5B may be performed by another device or a group of devices separate from or including commercial operator network 230, such as user device 210, public safety device 220, base station 240, devices included public safety operator network 250, and/or SFM server 270.

As shown in FIG. 5A, process 500 may include receiving a session request from user device 210 to initiate a session (block 510). For example, commercial operator network 230 may receive a request from user device 210, via base station 240, to connect to commercial operator network 230.

The request may indicate a user device identifier that uniquely identifies user device 210 (e.g., a phone number, an IP address, an international mobile subscriber identity (IMSI), an international mobile station equipment identify (IMEI), a mobile equipment identifier (MEID), etc.). Commercial operator network 230 may determine whether user device 210 is permitted to establish a connection with operator network 230 based on the user device identifier. For example, commercial operator network 230 may search a HSS/AAA server using the user device identifier to determine if user device 210 is permitted to connect to operator network 230.

As further shown in FIG. 5A, process 500 may include causing a session to be initiated with user device 210 via base station 240 (block 520). For example, commercial operator network 230 may cause the session to be initiated with user device 210.

Base station 240 and user device 210 may establish a connection via a frequency selected by base station 240. If the shared frequency is a frequency available to base station 240 to use for commercial purposes, base station 240 may select the shared frequency to communicate with user device 210.

Base station 240 may generate session initiation information that identifies a session identifier (which identifies the session), a base station identifier (which identifies the base station 240 used to initiate the session), a user device identifier of the user device 210 connected to base station 240, a time the session is initiated, and/or a frequency used to establish a connection for the session. In some implementations, base station 240 may only generate session initiation information if the shared frequency is used to establish the connection for the session.

As further shown in FIG. 5A, process 500 may include recording session initiation information (block 530). For example, commercial operator network 230 may record the session initiation information in a memory included in or accessible by commercial operator network 230.

As further shown in FIG. 5A, process 500 may include causing a handover of the session to another base station 240 (block 540). For example, commercial operator network 230 may cause a handover of the session to another base station 240.

As user device 210 moves from one geographic location to another, base station 240 may handover the session with user device 210 to another base station 240 that covers the location to which user device 210 moved. Each time a handover is completed, the base station 240 that receives the handover may generate handover information. The handover information may indicate the session identifier, a base station identifier of the base station 240 to which the session was handed over, a user device identifier, a time the session was handed over, a frequency used for the session after the handover, and/or a traffic counter. The traffic counter may indicate an amount of data and/or an amount of call minutes used during the session since the session initiation and/or since the most recent handover.

As further shown in FIG. 5A, process 500 may include recording handover information upon handover of the session to another base station 240 (block 550). For example, commercial operator network 230 may record handover information in a memory included in or accessible by commercial operator network 230. The handover information may be associated with the initiation information for the same session based on the session identifier included in the handover information and the initiation information. Commercial operator network 230 may record handover information each time the session is handed over from one base station 240 to another base station 240.

As shown in FIG. 5B, process 500 may include causing the session to be terminated (block 560). For example, commercial operator network 230 may cause the session with user device 210 to be terminated.

In some implementations, user device 210 may request that the session be terminated, and commercial operator network 230 and user device 210 may terminate the session. On the other hand, commercial operator network 230 may request that the session be terminated, and commercial operator network 230 and user device 210 may terminate the session.

A base station 240 that was being used for the session upon the session being terminated may generate termination information. The termination information may indicate the session identifier, a base station identifier of the base station 240, a user device identifier, a time the session was terminated, and/or a traffic counter.

As further shown in FIG. 5B, process 500 may include recording session termination information (block 570). For example, commercial operator network 230 may record termination information in a memory included in or accessible by commercial operator network 230. The termination information may be associated with the initiation information and/or the handover information for the same session based on the session identifier included in the termination information.

As further shown in FIG. 5B, process 500 may include determining payments for the session based on the jurisdiction information, the payment information, the initiation information, the handover information, and/or the termination information (block 580). For example, commercial operator network 230 may determine payments for the use of the shared frequency during the session.

Commercial operator network 230 may have used the shared frequency for commercial purposes during the session with user device 210, and thus may need to compensate a shared frequency rights holder for the use of the shared frequency. However, commercial operator network 230 may have used the shared frequency in multiple jurisdictions during the session where the shared frequency is controlled by different shared frequency rights holders. Accordingly, each of the shared frequency rights holders need to be compensated for the use of the shared frequency during the session.

Commercial operator network 230 may determine how much traffic was used at each base station 240, used to host the session, based on the initiation information, the handover information, and/or the termination information.

For example, the initiation information may identify a first base station 240 where the session started, a time the session started, and that the shared frequency was used by the first base station 240 for the session. First handover information may indicate a second base station 240 to which the session was handed over from the first base station 240. The first handover information may also identify a traffic counter (which identifies how much traffic (e.g., data) has been used since the initiation of the session), and/or a time of the handover. Thus, commercial operator network 230 may determine that the first base station 240 used the shared frequency based on the initiation information, and determine an amount of traffic used at the first base station 240 based on the traffic counter included in the first handover information. Additionally, or alternatively, commercial operator network 230 may determine an amount of call minutes, used at the first base station 240, by subtracting the time the session started from the time of the first handover.

Second handover information may indicate a third base station 240 to which the session was handed over from the second base station 240, a traffic counter, and/or a time of the handover. Thus, commercial operator network 230 may determine that the second base station 240 used the shared frequency based on the first handover information, and determine an amount of traffic used at the second base station 240 based on the traffic counter included in the second handover information and/or the traffic counter included in the first handover information. Additionally, or alternatively, commercial operator network 230 may determine an amount of call minutes, used at the second base station 240, by subtracting the time of the first handover from the time of the second handover.

Similarly, the termination information may be used with the Nth handover information (e.g., for the last handover before the termination of the session) to determine how much traffic and/or call minutes were used at the base station 240 being used when the session is terminated.

Accordingly, commercial operator network 230 may determine how much traffic was used at each base station 240 and whether each base station 240 actually used the shared frequency.

For each base station 240 that used the shared frequency for the session, commercial operator network 230 may determine which jurisdiction or jurisdictions receive credit for the use of the shared frequency, and how much credit, based on the jurisdiction information.

The jurisdiction information may associate a base station identifier, of a base station 240 that used the shared frequency, with one or more jurisdiction identifiers. The jurisdiction information may also indicate an amount of credit each jurisdiction should receive for use of the shared frequency by base station 240. Accordingly, commercial operator network 230 may search the jurisdiction information using a base station identifier, of base station 240 that used the shared frequency during the session, and identify one or more jurisdictions that receive credit, and how much credit the jurisdictions should receive for the use of the shared frequency during the session.

For example, if a jurisdiction receives 80% of the credit for use of the shared frequency at a particular base station 240, and a total 10 MB of data was used at the particular base station 240 during the session, then the jurisdiction may receive credit for 8 MB of data for the use of the shared frequency at the particular base station 240. The other 20% of the credit (e.g., 2 MB of the total 10 MB of data) may be distributed among one or more other jurisdictions based on the jurisdiction information. Commercial operator network 230 may repeat this process for each base station 240 that used the shared frequency during the session and determine how much credit (e.g., an amount of data and/or an amount of call minutes) each jurisdiction should receive for use of the shared frequency during the session.

Once commercial operator network 230 has determined how much credit each jurisdiction receives for use of the shared frequency during the session, commercial operator network 230 may determine a payment for each jurisdiction based on how much credit each jurisdiction receives and the payment information. For example, the payment information may indicate a monetary amount to be paid per amount of data used (e.g., a number of dollars per MB of data used) and/or a monetary amount to be paid per an amount of time used for a call (e.g., a number of dollars per minute used). Accordingly, commercial operator network 230 may determine a payment for each jurisdiction by multiplying the monetary amount (e.g., a number of dollars per MB) by the usage indicated by the credit (e.g., a number of MB used). Commercial operator network 230 may repeat this process for each jurisdiction that receives credit for use of the shared frequency during the session, and determine a payment for each jurisdiction.

In some implementations, the payment information may also associate a jurisdiction identifier, for a jurisdiction, with one or more shared frequency rights holder identifiers, which identify shared frequency rights holders to be paid for use of the shared frequency in a jurisdiction. The payment information may indicate a share of the payment that each shared frequency rights holder should receive. Accordingly, commercial operator network 230 may determine which shared frequency rights holders should receive payment for use of the shared frequency in a jurisdiction and what share of the total payment for the jurisdiction each shared frequency rights holder should receive.

As further shown in FIG. 5B, process 500 may include causing shared frequency rights holders to be compensated based on the determined payments (block 590). For example, commercial operator network 230 may cause the shared frequency rights holders to be compensated.

In some implementations, commercial operator network 230 may provide payment directly to the shared frequency rights holders.

Additionally, or alternatively, commercial operator network 230 may provide payment to a third party responsible for distributing payment to shared frequency rights holders. For example, commercial operator network 230 may provide the payment to the third party and indicate how much payment is due for each jurisdiction. The third party may then determine which shared frequency rights holders should receive payment and distribute the payment for the jurisdiction accordingly.

Although FIGS. 5A and 5B shows example blocks of process 500, in some implementations, process 500 may include additional blocks, fewer blocks, different blocks, or differently arranged blocks than those depicted in FIGS. 5A and 5B. Additionally, or alternatively, two or more of the blocks of process 500 may be performed in parallel.

Figure 6A:
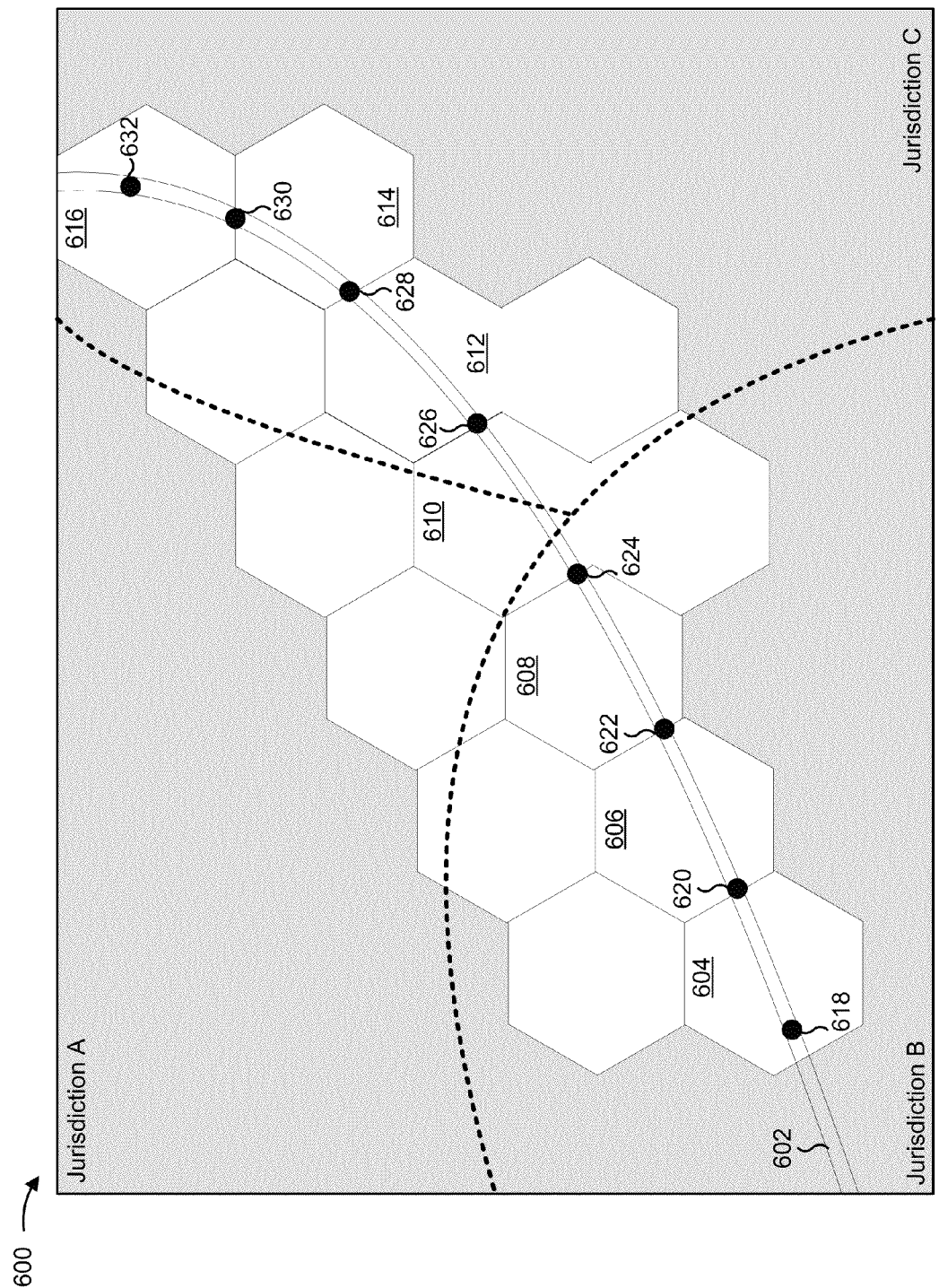
FIGS. 6A and 6B are diagrams of an example implementation relating to the example processes shown in FIGS. 4-5B.
Figure 6B:

FIGS. 6A and 6B are diagrams of an example implementation 600 relating to example process 400 and 500 shown in FIGS. 4-5B. FIGS. 6A and 6B show an example of preparing commercial operator network 230 for using the shared frequency and causing a shared frequency rights holder to be compensated for commercial operating network 230 using the shared frequency.

As shown in FIG. 6A, assume that a road 602 passes through jurisdiction A, jurisdiction B, and jurisdiction C. Assume a shared frequency rights holder A has rights to a shared frequency in jurisdiction A, a shared frequency rights holder B has rights to a shared frequency in jurisdiction B, and a shared frequency rights holder C has rights to a shared frequency in jurisdiction C. Also, assume the shared frequency is 700 MHz band 14.

Further, assume that commercial operator network 230 operates multiple base stations 240 within jurisdictions A, B, and C that are capable of using 700 MHz band 14 (e.g., the shared frequency) and 700 MHz band 13 (e.g., not a shared frequency). As shown in FIG. 6A, each base station 240 may be associated with a respective cell 604-616 (e.g., a respective coverage area of each base station 240). Moreover, assume commercial operator network 230 determines that band 14 is available for commercial use in cells 604, 606, 610, 612, and 614, but that band 14 is not available for commercial use in cells 608 and 616. Accordingly, commercial operator network 230 may notify base stations 240 associated with cells 604, 606, 610, 612, and 614 that band 14 is available for use to communicate with user devices 210, and may notify base stations 240 associated with cells 608 and 616 that band 14 is not available for use to communicate with user devices 210.

In FIG. 6A, assume user device 210 is traveling along road 602. Further, assume user device 210 initiates a session with commercial operator network 230 at point 618 within cell 604 via band 14 (e.g., the shared frequency). Commercial operator network 230 may store session initiation information indicating that the session was initiated at cell 604 using band 14.

Assume user device 210 continues along road 602 and reaches the edge of cell 604 at point 620, and that user device 210 used 1.2 MB of data while in cell 604. A base station 240 in cell 604 may handover the session to a base station 240 in cell 606 at this time. Assume user device 210 continues the session using band 14 in cell 606. Accordingly, commercial operator network 230 may store first handover information indicating that band 14 is used in cell 606 and that 1.2 MB of data was used in the session while in cell 604.

Assume user device 210 continues along road 602 and reaches the edge of cell 606 at point 622, and that user device 210 used 0.2 MB of data while in cell 606. A base station 240 in cell 606 may handover the session to a base station 240 in cell 608 at this time. Assume user device 210 continues the session using band 13 in cell 608. Accordingly, commercial operator network 230 may store second handover information indicating that band 13 is used in cell 608 and that 0.2 MB of data was used in the session while in cell 606.

Assume user device 210 continues along road 602 and reaches the edge of cell 608 at point 624, and that user device 210 used 0.9 MB of data while in cell 608. A base station 240 in cell 608 may handover the session to a base station 240 in cell 610 at this time. Assume user device 210 continues the session using band 14 in cell 610. Accordingly, commercial operator network 230 may store third handover information indicating that band 14 is used in cell 610 and that 0.9 MB of data was used in the session while in cell 608.

Assume user device 210 continues along road 602 and reaches the edge of cell 610 at point 626, and that user device 210 used 1.0 MB of data while in cell 610. A base station 240 in cell 610 may handover the session to a base station 240 in cell 612 at this time. Assume user device 210 continues the session using band 14 in cell 612. Accordingly, commercial operator network 230 may store third handover information indicating that band 14 is used in cell 612 and that 1.0 MB of data was used in the session while in cell 610.

Assume user device 210 continues along road 602 and reaches the edge of cell 612 at point 628, and that user device 210 used 0.1 MB of data while in cell 612. A base station 240 in cell 612 may handover the session to a base station 240 in cell 614 at this time. Assume user device 210 continues the session using band 14 in cell 614. Accordingly, commercial operator network 230 may store fourth handover information indicating that band 14 is used in cell 614 and that 0.1 MB of data was used in the session while in cell 612.

Assume user device 210 continues along road 602 and reaches the edge of cell 614 at point 630, and that user device 210 used 1.1 MB of data while in cell 614. A base station 240 in cell 614 may handover the session to a base station 240 in cell 616 at this time. Assume user device 210 continues the session using band 13 in cell 616. Accordingly, commercial operator network 230 may store fifth handover information indicating that band 13 is used in cell 616 and that 1.1 MB of data was used in the session while in cell 614.

Assumer user device 210 continues along the road and terminates the session at point 632 in cell 616, and that user device 210 used 0.5 MB of data while in cell 616. Accordingly, commercial operator network 230 may store session termination information indicating that 0.5 MB of data was used while in cell 616.

In FIG. 6B, assume commercial operator network 230 stores payment information indicating that each MB of data transmitted using band 14 in jurisdictions A, B, and C is charged $0.10.

As shown in FIG. 6B, commercial operator network 230 may store jurisdiction information indicating that jurisdiction B receives 100% credit for data transmitted using band 14 at cell 604. Accordingly, commercial operator network 230 may determine that jurisdiction B is owed $0.12 for the 1.2 MB of data transmitted using band 14 at cell 604 during the session.

As further shown in FIG. 6B, commercial operator network 230 may store jurisdiction information indicating that jurisdiction B receives 100% credit for data transmitted using band 14 at cell 606. Accordingly, commercial operator network 230 may determine that jurisdiction B is owed $0.02 for the 0.2 MB of data transmitted using band 14 at cell 606 during the session.

As shown in FIG. 6B, commercial operator network 230 may store jurisdiction information indicating that jurisdiction B receives 100% credit for data transmitted using band 14 at cell 608. However, the handover information may indicate that band 13 was used for the session at cell 608, and thus jurisdiction B is not owed payment for any data used at cell 608 during the session.

As shown in FIG. 6B, commercial operator network 230 may store jurisdiction information indicating that jurisdiction A receives 80% credit for data transmitted at cell 610, jurisdiction B receives 10% recited for data transmitted at cell 610, and jurisdiction C receives 10% credit for data transmitted at cell 610. Accordingly, commercial operator network 230 may determine that jurisdiction A is owed $0.08 for the 1.0 MB of data transmitted using band 14 at cell 610 during the session, jurisdiction B is owed $0.01 for the 1.0 MB of data transmitted using band 14 at cell 610 during the session, and jurisdiction C is owed $0.01 for the 1.0 MB of data transmitted using band 14 at cell 610 during the session.

As shown in FIG. 6B, commercial operator network 230 may store jurisdiction information indicating that jurisdiction C receives 100% credit for data transmitted using band 14 at cell 612. Accordingly, commercial operator network 230 may determine that jurisdiction C is owed $0.01 for the 0.1 MB of data transmitted using band 14 at cell 612 during the session.

As shown in FIG. 6B, commercial operator network 230 may store jurisdiction information indicating that jurisdiction C receives 100% credit for data transmitted using band 14 at cell 614. Accordingly, commercial operator network 230 may determine that jurisdiction C is owed $0.11 for the 1.1 MB of data transmitted using band 14 at cell 614 during the session.

As shown in FIG. 6B, commercial operator network 230 may store jurisdiction information indicating that jurisdiction C receives 100% credit for data transmitted using band 14 at cell 616. However, the handover information may indicate that band 13 was used for the session at cell 616, and thus jurisdiction C is not owed payment for any data used at cell 616 during the session.

Accordingly, commercial operator network 230 may determine a payment for each shared frequency rights holder by adding the payment due to each shared frequency rights holder at each cell 604-616. Thus, commercial operator network 230 may determine that shared frequency rights holder A is owed a total of $0.08 for the use of band 14 in jurisdiction A during the session, that shared frequency rights holder B is owed a total of $0.15 for the use of band 14 in jurisdiction B during the session, and that shared frequency rights holder C is owed a total of $0.13 for the use of band 14 in jurisdiction C during the session. Operator network 230 may then pay each shared frequency rights holders A, B, and C based on the amount owed.

As indicated above, FIGS. 6A and 6B are provided merely as an example. Other examples are possible and may differ from what was described with regard to FIGS. 6A and 6B.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, and/or a combination of hardware and software.

Some implementations are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, etc.

To the extent the aforementioned embodiments collect, store or employ personal information provided by individuals, it should be understood that such information shall be used in accordance with all applicable laws concerning protection of personal information. Additionally, the collection, storage and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items, and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. One or more devices, comprising:
one or more processors to:
store jurisdiction information that associates each of a plurality of base stations with at least one jurisdiction of a plurality of jurisdictions;
receive availability information indicating geographic locations where a frequency may be used;
notify base stations, of the plurality of base stations and included in the geographic locations, that the frequency may be used;
establish a session, between a first base station and a user device, that uses the frequency,
a plurality of rights holders having rights to the frequency in respective jurisdictions,
the respective jurisdictions including the at least one jurisdiction;
record handover information based on the first base station handing over the session to a second base station,
the handover information indicating an amount of data used while the session is hosted by the first base station,
the first base station and the second base station being included in the plurality of base stations;
determine a total amount of data used within each of the plurality of jurisdictions based on the handover information and the jurisdiction information; and
cause the plurality of rights holders to be compensated for use of the frequency in the plurality of jurisdictions based on an amount of data, of the total amount of data, used within each of the plurality of jurisdictions during the session.

2. The one or more devices of claim 1, where the jurisdiction information indicates that a group of jurisdictions are associated with the first base station,
the group of jurisdictions being included in the respective jurisdictions,
where the one or more processors, when causing the plurality of rights holders to be compensated, are to:
cause a group of rights holders, having rights to the frequency in the group of jurisdictions, to be compensated for use of the frequency based on the amount of data used while the session is hosted by the first base station.

3. The one or more devices of claim 2, where the jurisdiction information indicates a share of credit each of the group of jurisdictions receives for data used while the session is hosted by the first base station, and
where the one or more processors, when causing the group of rights holders to be compensated, are to:
compensate the group of rights holders based on the share of credit.

4. The one or more devices of claim 1, where the one or more processors are further to:
determine a share of credit the at least one jurisdiction receives for data used while the session is hosted by the first base station based on a proportion of a coverage area of the first base station included in the at least one jurisdiction, and
where the one or more processors, when causing the plurality of rights holders to be compensated, are to:
compensate a particular rights holder, associated with the first base station, based on the share of credit.

5. The one or more devices of claim 1, where the one or more processors are further to:
determine a share of credit the at least one jurisdiction receives for data used while the session is hosted by the first base station based on a geography of a coverage area of the first base station, and
where the one or more processors, when causing the plurality of rights holders to be compensated, are to:
compensate a particular rights holder, associated with the first base station, based on the share of credit.

6. The one or more devices of claim 1, where the one or more processors are further to:
store payment information indicating a cost of using the frequency in the at least one jurisdiction,
where the one or more processors, when causing the plurality of rights holders to be compensated, are to:
cause a particular rights holder, associated with the first base station, to be compensated for use of the frequency based on the payment information and the amount of data used while the session is hosted by the first base station.

7. The one or more devices of claim 1, where the jurisdiction information indicates that the second base station is associated with a different jurisdiction, of the plurality of jurisdictions, than the first base station, and
where the one or more processors are further to:
cause a rights holder, associated with the second base station, to be compensated for use of the frequency based on an amount of data used while the session is hosted by the second base station,
the rights holder being included in the plurality of rights holders.

8. A non-transitory computer-readable medium storing instructions, the instructions comprising:
one or more instructions that, when executed by one or more processors, cause the one or more processors to:
store jurisdiction information identifying a plurality of jurisdictions associated with a plurality of base stations,
each jurisdiction, of the plurality of jurisdictions, being associated with a rights holder, of a plurality of rights holders, that has rights to a frequency in the jurisdiction;
receive availability information indicating geographic locations where the frequency may be used;
notify base stations, of the plurality of base stations and included in the geographic locations, that the frequency may be used;
cause a session to be established with a user device, via at least one of the plurality of base stations, using the frequency;
record handover information based on the session being handed over from a first base station to a second base station,
the plurality of base stations including the first base station and the second base station,
the handover information indicating an amount of data used during the session while hosted by the first base station;

determine a total amount of data used within each of the plurality of jurisdictions based on the handover information and the jurisdiction information; and cause the plurality of rights holders to be compensated for use of the frequency in the plurality of jurisdictions based on an amount of data, of the total amount of data, used within each of the plurality of jurisdictions during the session.

9. The non-transitory computer-readable medium of claim 8, where the one or more instructions, that cause the one or more processors to receive the availability information, cause the one or more processors to:

calculate availability information indicating geographic locations where the frequency may be used for the session based on a capacity of the frequency being used for a primary purpose of communication in the geographic locations.

10. The non-transitory computer-readable medium of claim 8, where the handover information indicates a particular frequency used for the session by the first base station, where the one or more instructions, that cause the plurality of rights holders to be compensated, cause the one or more processors to:

compensate one or more of the plurality of rights holders based on the particular frequency being the frequency.

11. The non-transitory computer-readable medium of claim 8, where the one or more instructions, that cause the plurality of rights holders to be compensated, cause the one or more processors to:

only compensate the plurality of rights holders for data communicated using the frequency.

12. The non-transitory computer-readable medium of claim 8, where the handover information indicates a time the session is handed over, where the one or more instructions, that cause the plurality of rights holders to be compensated, cause the one or more processors to:

compensate the plurality of rights holders based on the time the session is handed over.

13. The non-transitory computer-readable medium of claim 8, where the one or more instructions, when executed by the one or more processors, further cause the one or more processors to:

determine an amount of time the session was hosted by each of the plurality of base stations, and where the one or more instructions, that cause the plurality of rights holders to be compensated, cause the one or more processors to:

compensate the plurality of rights holders based on the amount of time the session was hosted by each of the plurality of base stations.

14. The non-transitory computer-readable medium of claim 8, where one or more instructions, that cause the one or more processors to determine the total amount of data used within each of the plurality of jurisdictions, cause the one or more processors to:

determine an amount of data used at each base station, of the plurality of base stations, and whether each base station, of the plurality of base stations, used the frequency for the session.

15. A method, comprising:

storing, by at least one device, jurisdiction information that associates a plurality of jurisdictions with a plurality of base stations, each jurisdiction, of the plurality of jurisdictions, being associated with a respective rights holder, of a plurality of rights holders, that has rights to a frequency in the jurisdiction;

receiving, by the at least one device, availability information indicating geographic locations where the frequency may be used;

notifying base stations, of the plurality of base stations and included in the geographic locations, that the frequency may be used;

causing, by the at least one device, a session to be established with a user device, via at least one of the plurality of base stations, using the frequency;

recording, by the at least one device, handover information based on the session being handed over between respective base stations, the handover information indicating an amount of traffic transmitted over the frequency during the session while hosted by a respective base station;

determining, by the at least one device, a total amount of traffic used within each of the plurality of jurisdictions based on the handover information and the jurisdiction information; and causing, by the at least one device, the plurality of rights holders to be compensated for use of the frequency in the plurality of jurisdictions during the session based on an amount of traffic, of the total amount of traffic, used within each of the plurality of jurisdictions during the session.

16. The method of claim 15, further comprising:

recording session initiation information that includes a session identifier, a base station identifier identifying an initiation base station used to initiate the session, a user device identifier identifying the user device, information indicating a time the session is initiated, and information indicating an initiation frequency, and where causing the plurality of rights holders to be compensated includes compensating the plurality of rights holders based on the session initiation information and the handover information.

17. The method of claim 15, further comprising:

recording session termination information that includes a session identifier, a base station identifier identifying a termination base station used while the session is terminated, information indicating a time the session is terminated, and information indicating a traffic counter;

where causing the plurality of rights holders to be compensated includes compensating the plurality of rights holders based on the session termination information and the handover information.

18. The method of claim 15, where determining the total amount of traffic used within each of the plurality of jurisdictions further comprises:

determining an amount of traffic used at each base station, of the plurality of base stations, and whether each base station, of the plurality of base stations, used the frequency for the session.

19. The method of claim 15, where determining the total amount of traffic used within each of the plurality of jurisdictions further comprises:

determining which of the plurality of jurisdictions receive credit for the use of the frequency during the session.

20. The method of claim 15, further comprising:

determining a share of credit a respective jurisdiction, of the plurality of jurisdictions, receives for data used while the session is hosted by a corresponding base station, of the plurality of base stations, based on a geography of a coverage area of the corresponding base station, and where causing the plurality of rights holder to be compensated includes:

compensating a particular rights holder, associated with the corresponding base station, based on the share of credit.

* * * * *